(12) United States Patent
Tang et al.

(10) Patent No.: US 12,603,385 B2
(45) Date of Patent: Apr. 14, 2026

(54) STRUCTURAL BEAM, BOX, BATTERY, AND ELECTRIC DEVICE

(71) Applicant: CONTEMPORARY AMPEREX TECHNOLOGY (HONG KONG) LIMITED, Hong Kong (CN)

(72) Inventors: Yu Tang, Ningde (CN); Chenyi Xu, Ningde (CN); Chenchen Zhang, Ningde (CN); Xing Li, Ningde (CN); Xiaoteng Huang, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/021,320

(22) Filed: Jan. 15, 2025

(65) Prior Publication Data

US 2025/0158216 A1     May 15, 2025

Related U.S. Application Data

(63) Continuation of application No. PCT/CN2022/121220, filed on Sep. 26, 2022.

(30) Foreign Application Priority Data

Aug. 17, 2022     (WO) ................ PCT/CN2022/113154
Aug. 17, 2022     (WO) ................ PCT/CN2022/113157

(51) Int. Cl.
H01M 50/367          (2021.01)
H01M 10/658          (2014.01)
(Continued)

(52) U.S. Cl.
CPC ....... H01M 50/367 (2021.01); H01M 10/658 (2015.04); H01M 50/289 (2021.01); H01M 50/375 (2021.01)

(58) Field of Classification Search
None
See application file for complete search history.

(56) References Cited

U.S. PATENT DOCUMENTS

| | | | | | |
|---|---|---|---|---|---|
| 1,360,720 | A | * | 11/1920 | Edward ................... | B64C 1/065 |
| | | | | | 52/842 |
| 2,082,792 | A | * | 6/1937 | Dean ...................... | B64C 1/065 |
| | | | | | 52/840 |

(Continued)

FOREIGN PATENT DOCUMENTS

| | | |
|---|---|---|
| CN | 102473884 A | 5/2012 |
| CN | 111668408 A | 9/2020 |

(Continued)

OTHER PUBLICATIONS

International Search Report and Written Opinion mailed on May 6, 2023, received for PCT Application PCT/CN2022/121055, filed on Sep. 23, 2022, 15 pages including English Translation.

(Continued)

*Primary Examiner* — Amanda J Barrow
(74) *Attorney, Agent, or Firm* — XSENSUS LLP

(57) ABSTRACT

This application provides a structural beam, a box, a battery, and an electric device, so as to solve the problem of waste of space and low volume utilization in arrangement of a structural beam inside a battery in the prior art. The structural beam provided in this application includes a first side wall and a second side wall. An exhaust passage is formed between the first side wall and the second side wall. The first side wall is provided with a first exhaust portion. The first exhaust portion is configured to receive emissions from at least one battery cell. The second side wall is provided with a second exhaust portion. The second exhaust portion is configured to receive emissions from at least one of remaining battery cells.

9 Claims, 6 Drawing Sheets

100

(51) Int. Cl.
  H01M 50/289 (2021.01)
  H01M 50/375 (2021.01)

(56) References Cited

U.S. PATENT DOCUMENTS

| | | | | |
|---|---|---|---|---|
| 5,553,437 A * | 9/1996 | Navon | ...................... | E04C 3/07 |
| | | | | 52/837 |
| 2009/0256399 A1 * | 10/2009 | Sherbeck | ............... | B62D 21/02 |
| | | | | 296/204 |
| 2016/0093870 A1 | 3/2016 | DeKeuster et al. | | |
| 2022/0123423 A1 * | 4/2022 | Wang | ................. | H01M 50/249 |
| 2022/0407177 A1 * | 12/2022 | Zhang | ................. | H01M 50/358 |
| 2025/0192331 A1 * | 6/2025 | Zhang | ................. | H01M 10/613 |
| 2025/0192357 A1 * | 6/2025 | Zhang | ................. | H01M 50/291 |
| 2025/0192359 A1 * | 6/2025 | Zhang | ................. | H01M 50/358 |
| 2025/0210791 A1 * | 6/2025 | Sui | ...................... | H01M 50/204 |

FOREIGN PATENT DOCUMENTS

| | | | | | |
|---|---|---|---|---|---|
| CN | 111668409 A | | 9/2020 | | |
| CN | 112331992 A | | 2/2021 | | |
| CN | 112928376 A | | 6/2021 | | |
| CN | 215680882 | * | 6/2021 | ............... | A62C 3/16 |
| CN | 214227064 U | | 9/2021 | | |
| CN | 113594598 A | | 11/2021 | | |
| CN | 215680882 U | | 1/2022 | | |
| CN | 216563418 U | | 5/2022 | | |
| CN | 216793916 U | | 6/2022 | | |
| CN | 217158419 U | | 8/2022 | | |
| CN | 217239672 U | | 8/2022 | | |
| CN | 218039516 U | | 12/2022 | | |
| EP | 3905377 A1 | | 11/2021 | | |
| EP | 4564560 A1 | | 6/2025 | | |
| JP | 2007-027011 A | | 2/2007 | | |
| JP | 2020-042982 A | | 3/2020 | | |
| WO | WO 2021/088570 | * | 5/2021 | .............. | H01M 2/12 |
| WO | 2022/006895 A1 | | 1/2022 | | |
| WO | 2022/043262 A1 | | 3/2022 | | |
| WO | WO 2022/041062 | * | 3/2022 | .......... | H01M 50/342 |

OTHER PUBLICATIONS

International Search Report and Written Opinion mailed on May 4, 2023, received for PCT Application PCT/CN2022/121220, filed on Sep. 26, 2022, 14 pages including English Translation.

International Search Report and Written Opinion mailed on May 4, 2023, received for PCT Application PCT /CN2022/113157, filed on Aug. 17, 2022, 11 pages including English Translation.

International Search Report and Written Opinion mailed on May 4, 2023, received for PCT Application PCT /CN2022/113154, filed on Aug. 17, 2022, 16 pages including English Translation.

Extended European Search Report issued Nov. 24, 2025 in European Patent Application No. 22955479.5.

* cited by examiner

300

200

210

100

100

STRUCTURAL BEAM, BOX, BATTERY, AND ELECTRIC DEVICE

CROSS-REFERENCE TO RELATED APPLICATIONS

This application is a continuation of International Application No. PCT/CN2022/121220, filed on Sep. 26, 2022, which claims priority to PCT/CN2022/113154, filed on Aug. 17, 2022 and PCT/CN2022/113157, filed on Aug. 17, 2022, all of which are hereby incorporated by reference in its entirety.

TECHNICAL FIELD

This application relates to the field of battery technologies, and in particular, to a structural beam, a box, a battery, and an electric device.

BACKGROUND

In recent years, there has been a leap in the development of new energy vehicles. In the field of electric vehicles, traction batteries serve as an irreplaceable and crucial power source.

In the prior art, a battery typically includes a plurality of battery cells, and the plurality of battery cells are arranged in a tightly fitted manner. However, there is a possibility of thermal runaway in battery cells during use. Once a battery cell experiences thermal runaway and emits emissions, surrounding battery cells may be affected, or even a chain reaction is triggered, posing significant safety hazards.

SUMMARY

In view of this, this application provides a structural beam, a box, a battery, and an electric device, so as to solve the problem of poor battery safety in the prior art.

According to a first aspect, this application provides a structural beam. The structural beam includes a first side wall and a second side wall, where an exhaust passage is formed between the first side wall and the second side wall. The first side wall is provided with a first exhaust portion, where the first exhaust portion is configured to receive emissions from at least one battery cell. The second side wall is provided with a second exhaust portion, where the second exhaust portion is configured to receive emissions from at least one of remaining battery cells.

In the above solution, the structural beam is provided with the exhaust passage inside. Battery cells on two sides of the structural beam can exhaust gas into the exhaust passage through holes in the first side wall or second side wall, so as to prevent high-temperature gas from affecting other battery cells, thus improving arrangement of battery cells inside a battery compartment, saving internal space of the battery, and increasing volume utilization, energy density, and safety of the battery.

In a possible design, the first side wall and the second side wall are opposite each other in a first direction.

In the above solution, the battery cells are arranged on two sides of the structural beam, facilitating arrangement of the battery cells into groups. Such arrangement also improves heat dissipation for the battery while ensuring effective exhaust.

In a possible design, in the first direction, the first exhaust portion and the second exhaust portion are staggered.

In the above solution, the staggered arrangement of the first exhaust portion and second exhaust portion prevents emissions ejected from the first exhaust portion and second exhaust portion from affecting each other.

In a possible design, in the first direction, the first exhaust portion and the second exhaust portion are opposite each other; and the structural beam further includes a thermal insulation member, where the thermal insulation member is disposed between the first exhaust portion and the second exhaust portion.

In the above solution, the thermal insulation member separates the exhaust passage, preventing battery cells in directions of the first side wall and second side wall from affecting each other in a case of thermal runaway.

In a possible design, in the first direction, a projection of the first exhaust portion and a projection of the second exhaust portion at least partially overlap to form an overlapping region, and a projection of the thermal insulation member covers at least the overlapping region.

In the above solution, the projection of the first exhaust portion and the projection of the second exhaust portion overlap to form the overlapping region, and the projection of the thermal insulation member covers at least the overlapping region. In this way, the thermal insulation member can prevent battery cells in the directions of the first side wall and second side wall from affecting each other in a case of thermal runaway.

In a possible design, the structural beam extends along a second direction, the first side wall is provided with a plurality of first exhaust portions, and the second side wall is provided with a plurality of second exhaust portions; and the thermal insulation member extends along the second direction and is located between the first side wall and the second side wall.

In the above solution, the thermal insulation member and the structural beam extend in the same direction, facilitating not only blocking of the emissions ejected from the first exhaust portion and second exhaust portion but also installation of the thermal insulation member.

In a possible design, the thermal insulation member separates the exhaust passage into a first passage and a second passage, where the first passage communicates with the first exhaust portion, and the second passage communicates with the second exhaust portion.

In the above solution, the emissions ejected from the first exhaust portion enter the first passage, and the emissions ejected from the second exhaust portion enter the second passage, avoiding mutual interference.

In a possible design, the thermal insulation member is configured to be movable inside the exhaust passage in the first direction, so as to change size of the first passage or second passage.

In the above solution, the thermal insulation member can change the sizes of the first passage and second passage. In a case of thermal runaway of a battery cell on a side, the size of the first passage or second passage can be correspondingly increased, thereby improving the exhaust efficiency and enhancing the safety of the battery.

In a possible design, the structural beam further includes a support member, where the support member is configured to fix the thermal insulation member.

In the above solution, the support member can guarantee position and posture of the thermal insulation member under normal conditions.

In a possible design, at least a portion of the support member is configured to be able to react with emissions from the battery cells, so as to enable the thermal insulation member to be movable in the first direction.

In the above solution, when a battery cell experiences thermal runaway and ejects gas into the exhaust passage, the thermal insulation member can be melted, so that the thermal insulation member can move under the propulsion of the gas ejected from the battery cell in thermal runaway, thereby expanding the exhaust space on the side of the battery cell in thermal runaway.

In a possible design, at least a portion of the support member is configured to be able to be melted when the emissions from the battery cells are discharged into the exhaust passage.

In the above solution, the support member can be melted when the battery cell ejects emissions, so that the thermal insulation member can move under the propulsion of the gas ejected from the battery cell in thermal runaway, thereby expanding the exhaust space on the side of the battery cell in thermal runaway.

In a possible design, the structural beam is further provided with a reinforcing member, where the reinforcing member is disposed inside the exhaust passage and located between the first side wall and the second side wall, the reinforcing member separates the exhaust passage into a first sub-passage and a second sub-passage, and the reinforcing member is provided with a communicating hole communicating with the first sub-passage and the second sub-passage.

In the above solution, the reinforcing member enhances structural strength of the structural beam, and the communicating hole in the reinforcing member can ensure that the gas ejected from the battery cell can be expelled through the first sub-passage and second sub-passage, thereby improving the exhaust efficiency.

In a possible design, in the first direction, the first exhaust portion and the second exhaust portion are both staggered with respect to the communicating hole.

In the above solution, the gas ejected from the communicating hole can be prevented from directly heading to the first exhaust portion or the second exhaust portion, thereby preventing high-temperature gas from directly hitting the battery cell.

In a possible design, the first exhaust portion, the second exhaust portion, and the communicating hole are each provided in plurality; where the plurality of communicating holes include a first communicating hole; and in the first direction, one of any adjacent first exhaust portion and second exhaust portion overlaps a projection of the first communicating hole, and the other is staggered with respect to the projection of the first communicating hole.

In the above solution, the first exhaust portion, second exhaust portion, and communicating hole are provided in plurality, so as to improve the exhaust efficiency. This can also prevent the gas ejected from the communicating hole from directly hitting the first exhaust portion or the second exhaust portion, thereby preventing high-temperature gas from directly hitting the battery cell.

In a possible design, the reinforcing member includes a first connecting end and a second connecting end opposite each other, where the first connecting end and the second connecting end are both connected to two opposite side walls of the structural beam.

In the above solution, the first connecting end and the second connecting end correspondingly support two opposite sides of the structural beam, further enhancing the structural strength of the structural beam.

In a possible design, the first connecting end includes a first sub-connecting portion and second sub-connecting portion arranged in a bifurcated manner, where the first sub-connecting portion is connected to the first side wall, and the second sub-connecting portion is connected to the second side wall.

In the above solution, the first connecting end is bifurcated and two branch ends respectively support the first side wall and second side wall, further enhancing the structural strength of the structural beam.

In a possible design, the second connecting end includes a third sub-connecting portion and fourth sub-connecting portion arranged in a bifurcated manner, where the third sub-connecting portion is connected to the first side wall, and the fourth sub-connecting portion is connected to the second side wall.

In the above solution, the second connecting end is bifurcated and two branch ends respectively support the first side wall and second side wall, further enhancing the structural strength of the structural beam.

In a possible design, the structural beam further includes protective members, where the protective members include a first protective member and a second protective member, the first protective member is located between the first exhaust portion and the communicating hole, and the second protective member is located between the second exhaust portion and the communicating hole.

In the above solution, the first protective member can block entering of high-temperature gas from the first sub-passage through the communicating hole into the second sub-passage, and the second protective member can block entering of high-temperature gas from the second sub-passage through the communicating hole into the first sub-passage, thereby preventing the battery cells on the two sides from affecting each other.

In a possible design, the first protective member and the second protective member are each provided with a ventilation hole.

In the above solution, the ventilation holes can enhance exhaust capability.

In a possible design, the ventilation holes include a first ventilation hole and a second ventilation hole, where the first ventilation hole is provided in the first protective member, and a projection of the first ventilation hole in the first direction is staggered with respect to the first exhaust portion; and the second ventilation hole is provided in the second protective member, and a projection of the second ventilation hole in the first direction is staggered with respect to the second exhaust portion.

In the above solution, the first protective member can prevent high-temperature gas from directly heading to the first exhaust portion, and the second protective member can prevent high-temperature gas from directly heading to the second exhaust portion, thereby preventing the high-temperature gas generated by the battery cell in thermal runaway from triggering a chain reaction.

In a possible design, in the first direction, a projection of the ventilation hole at least partially overlaps a projection of the communicating hole.

In the above solution, the overlapping of the ventilation hole and the communicating hole can improve the exhaust efficiency.

According to a second aspect, this application provides a box. The box includes the structural beam according to any one of the foregoing embodiments and obviously has the advantages of the foregoing structural beam.

According to a third aspect, this application provides a battery. The battery includes a plurality of battery cells and the structural beam according to any one of the foregoing embodiments; or the battery includes a plurality of battery cells and the foregoing box, where the box is configured to accommodate the plurality of battery cells.

In the above solution, when experiencing failure, a battery cell inside the battery can promptly expel high-temperature gas, and do not affect surrounding battery cells, ensuring good safety.

With reference to the third aspect, in a possible design, at least one of the battery cells is connected to the first side wall of the structural beam, and at least another of the battery cells is connected to the second side wall of the structural beam.

In the above solution, the battery cells are disposed on two sides of the structural beam, improving the safety of the battery.

According to a fourth aspect, this application provides an electric device. The electric device includes the foregoing battery, where the battery is configured to supply power for the electric device, exhibiting good safety performance.

Other features and advantages of the embodiments of this application will be set forth in the following description of the specification, and partially become obvious in the specification, or can be understood through implementation of the embodiments of this application. The objectives and other advantages of the embodiments of this application are implemented and obtained through the structures particularly specified in the specification and accompanying drawings.

Figure 1:
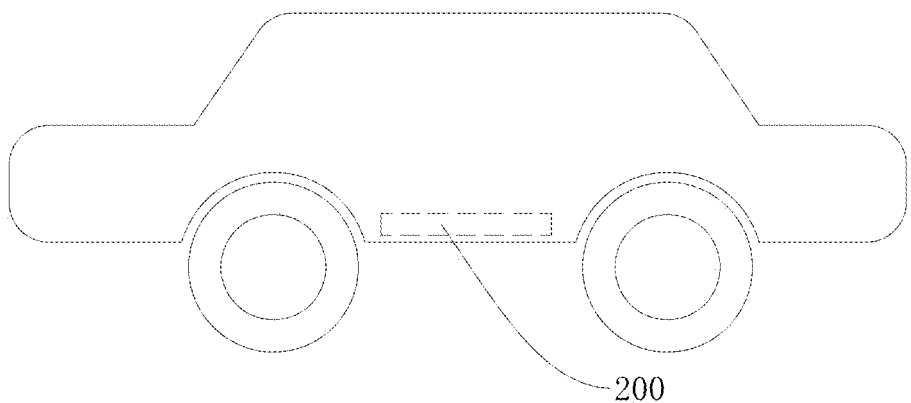
FIG. 1 is a schematic diagram of an electric device according to an embodiment of this application.

REFERENCE SIGNS 10. box; 100. structural beam; 200. battery; 210. battery cell; 211. cover; 212. electrode assembly; 213. housing; 300. electric device; 11. first side wall; 111. first exhaust portion; 12. second side wall; 121. second exhaust portion; 13. exhaust passage; 131. first passage; 132. second passage; 14. support member; 2. thermal insulation member; 3. reinforcing member; 31. first sub-passage; 32. second sub-passage; 33. communicating hole; 34. first connecting end; 341. first sub-connecting portion; 342. second sub-connecting portion; 35. second connecting end; 351. third sub-connecting portion; 352. fourth sub-connecting portion; 4. first protective member; 41. first ventilation hole; 42. first thermal insulation retainer; 5. second protective member; 52. second ventilation hole; and 53. second thermal insulation retainer.

The accompanying drawings herein are incorporated into this specification and form a part of this specification. They illustrate embodiments conforming to this application and are intended to explain the principles of this application together with this specification.

DESCRIPTION OF EMBODIMENTS

For better understanding of technical solutions of this application, the following describes the embodiments of this application in detail with reference to the accompanying drawings.

It should be clear that the described embodiments are merely some but not all embodiments of this application. All other embodiments obtained by persons of ordinary skill in the art based on the embodiments of this application without creative efforts shall fall within the protection scope of this application.

It should be understood that the term "and/or" used in this specification is only an associative relationship for describing associated objects, indicating that three relationships may be present. For example, A and/or B may indicate three cases: presence of only A; presence of both A and B; and presence of only B. In addition, the character "/" in this specification generally indicates an "or" relationship between contextually associated objects.

The terms used in the embodiments of this application are merely intended to describe specific embodiments, but not intended to limit this application. The terms "a/an", "the", and "this" of singular forms used in the embodiments and the appended claims of this application are also intended to include plural forms, unless otherwise specified in the context clearly.

In the description of the embodiments of this application, the terms "first", "second", and the like are merely intended to distinguish between different objects, and shall not be understood as any indication or implication of relative importance or any implicit indication of the number, sequence or primary-secondary relationship of the technical features indicated. In the descriptions of the embodiments of this application, "a plurality of" means at least two unless otherwise specifically stated.

Reference to "embodiment" in this application means that specific features, structures, or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the means or components mentioned must have specific orientations or must be constructed or manipulated according to specific orientations, and therefore shall not be construed as any limitations on embodiments of this application. In addition, in the context, it should be further understood that when an element is described as being "above" or "under" another element, that element may not only be directly connected "above" or "under" the another element, but also be indirectly connected "above" or "under" the another element through an intermediate element.

In the description of the embodiments of this application, unless otherwise specified and defined explicitly, the terms "mounting", "connection", "join", and "fastening" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skills in the art can understand specific meanings of these terms in this application as appropriate to specific situations.

To make the description of the following embodiments clear and concise, a brief introduction to the relevant concepts or technologies is given first.

The battery mentioned in the embodiments of this application is a single physical module that includes one or more battery cells for providing higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell. The battery may be a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application.

Specifically, the battery may include a box and a battery cell, where the battery cell is accommodated in the box. The box is configured to provide an accommodating space for the battery cell, and the box may be a variety of structures. In some embodiments, the box may include a first portion and a second portion. The first portion and the second portion fit together so that the first portion and the second portion jointly define an accommodating space for accommodating the battery cell. The second portion may be a hollow structure with an opening at one side, the first portion may be a plate-shaped structure, and the first portion covers the opening side of the second portion so that the first portion and the second portion jointly define the accommodating space. Alternatively, both the first portion and the second portion may be hollow structures with an opening at one side, and the opening side of the first portion is engaged with the opening side of the second portion. Certainly, the box formed by the first portion and the second portion may be of various shapes, such as cylinder or cuboid. The battery cell may be provided in plurality, and the plurality of battery cells may be connected in series, parallel, or series-parallel, where being connected in series-parallel means a combination of series and parallel connections of the plurality of battery cells. The plurality of battery cells may be directly connected in series, parallel, or series-parallel, and then an entirety of the plurality of battery cells is accommodated in the box; or certainly, the battery may be formed by a plurality of battery cells being connected in series, parallel, or series-parallel first to form a battery module and then a plurality of battery modules being connected in series, parallel, or series-parallel to form an entirety which is accommodated in the box. The battery may further include other structures. For example, the battery may further include a busbar configured to implement electrical connection between the plurality of battery cells. Each battery cell may be a secondary battery or a primary battery, a lithium-sulfur battery, a sodium-ion battery, or a magnesium-ion battery, without being limited thereto. The battery cell may be cylindrical, flat, cuboid, or of other shapes.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. The part of positive electrode current collector uncoated with the positive electrode active substance layer protrudes out of the part of positive electrode current collector coated with the positive electrode active substance layer and serves as a positive electrode tab. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. The part of negative electrode current collector uncoated with the negative electrode active substance layer protrudes out of the part of negative electrode current collector coated with the negative electrode active substance layer and serves as a negative electrode tab. The negative electrode current collector may be made of copper, and the negative electrode active substance may be carbon, silicon, or the like. To allow a large current to pass through without any fusing, multiple positive electrode tabs are provided and stacked together, and multiple negative electrode tabs are provided and stacked together. The separator may be made of PP (polypropylene, polypropylene), PE (polyethylene, polyethylene), or the like. In addition, the electrode assembly may be a wound structure or a stacked structure. However, the embodiments of this application are not limited thereto.

The battery cell may be cylindrical, flat, cuboid, or of other shapes. This is not limited in the embodiments of this application either. Battery cells are typically divided into three types by packaging method: cylindrical cell, prismatic cell, and pouch cell. This is not limited in the embodiments of this application either.

In recent years, there has been a leap in the development of new energy vehicles. In the field of electric vehicles, traction batteries serve as an irreplaceable and crucial power source. A battery consists of a box and a plurality of battery cells accommodated in the box. As a core component of new energy vehicles, batteries have high requirements in terms of both safety and cycle life.

The applicant has found that when experiencing thermal runaway, a battery cell generates a large amount of heat and ejects high-temperature emissions (usually in a gaseous form), which leads to increased internal temperature of a battery. In addition, a structure with stacked arrangement of a plurality of battery cells exacerbates such phenomenon, seriously affecting performance and service life of remaining battery cells, and may even cause explosion of the battery during use, which is not conducive to consumer safety.

Therefore, in the prior art, to avoid explosion of a battery cell caused by poor exhaust after thermal runaway, an exhaust passage with a certain size is often left on a side of the battery cell (for example, at a position directly opposite an explosion-proof valve) to accelerate discharge of emissions, thereby preventing thermal diffusion caused by thermal runaway. However, in existing design solutions, a certain distance between a battery cell and a structural beam is left as an exhaust passage, and such structural arrangement wastes a lot of space, affects arrangement space of battery cells inside a battery compartment, and reduces volume utilization.

Based on the above considerations, to improve the arrangement of battery cells inside a battery compartment, save internal space of the battery, and enhance the volume utilization, energy density, and safety of the battery, the applicant, after in-depth research, has designed a structural beam. The structural beam includes a first side wall and a second side wall, where an exhaust passage is formed between the first side wall and the second side wall. The first side wall is provided with a first exhaust portion, where the first exhaust portion is configured to receive emissions from at least one battery cell. The second side wall is provided with a second exhaust portion, where the second exhaust portion is configured to receive emissions from at least one of remaining battery cells. In this solution, provision of the exhaust passage inside the structural beam allows battery cells on two sides of the structural beam to exhaust gas into the exhaust passage through holes in the first side wall or second side wall, thus improving the arrangement of battery cells inside the battery compartment, saving internal space of the battery, and increasing volume utilization, energy density, and safety of the battery.

The electric device mentioned in this application may be but is not limited to a notebook computer, a pen-input computer, a mobile computer, an electronic book player, a portable telephone, a portable fax machine, a portable copier, a portable printer, a headset, a video recorder, a liquid crystal display television, a watch, a sport wristband, a portable cleaner, a portable CD player, a transceiver, an electronic notebook, a calculator, a portable recorder, a radio, a standby power source, a motor, an automobile, a motorcycle, a motor bicycle, a lighting appliance, a toy, a game console, an electric tool, a flash lamp, or a lithium ion capacitor. When the electric device is a vehicle, the vehicle may be a fossil fuel vehicle, a natural-gas vehicle, or a new energy vehicle, where the new energy vehicle may be a battery electric vehicle, a hybrid electric vehicle, a range-extended vehicle, or the like.

For ease of description, the electric device 300 of an embodiment of this application being a vehicle is used as an example for description of the following embodiments.

Referring to FIG. 1, FIG. 1 is a schematic diagram of an electric device according to an embodiment of this application. The electric device in the figure is a vehicle, and the vehicle may be a fossil fuel vehicle, a natural-gas vehicle, or a new energy vehicle, where the new energy vehicle may be a battery electric vehicle, a hybrid electric vehicle, a range-extended vehicle, or the like. The vehicle is provided with a battery 200 inside, where the battery 200 may be disposed at the bottom, front, or rear of the vehicle. The battery 200 may be configured to supply power to the vehicle. For example, the battery 200 may be used as an operational power source for the vehicle. The vehicle may further include a controller and a motor, where the controller is configured to control the battery 200 to supply power to the motor, for example, to satisfy power needs of start, navigation, and driving of the vehicle.

Figure 2:
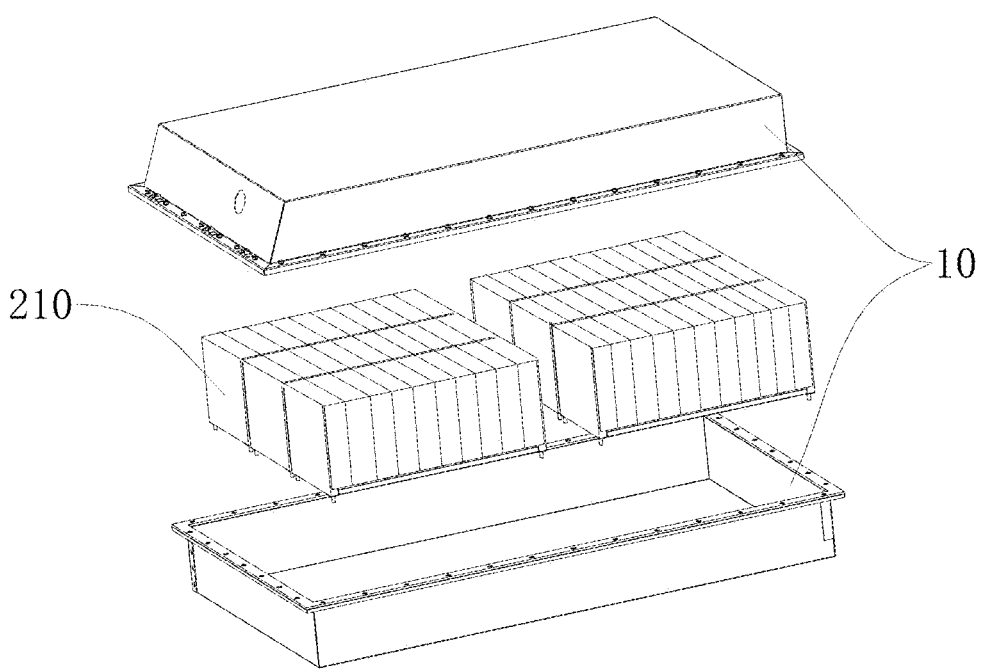
FIG. 2 is a schematic diagram of a battery according to an embodiment of this application.
Figure 3:
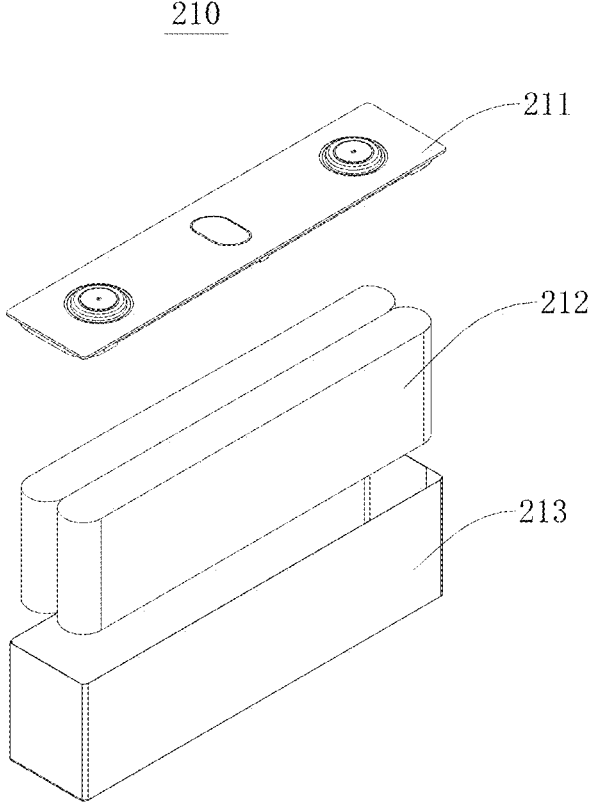
FIG. 3 is a schematic diagram of a battery cell according to an embodiment of this application.

Referring to FIG. 2, FIG. 2 is a schematic diagram of a battery according to an embodiment of this application. In the battery 200, a plurality of battery cells 210 may be connected in series, parallel, or series-parallel, where being connected in series-parallel means a combination of series and parallel connections of the plurality of battery cells 210. Referring to FIG. 3, FIG. 3 is a schematic diagram of a battery cell according to an embodiment of this application. The battery cell 210 includes a cover 211, an electrode assembly 212 and a housing 213. A plurality of battery cells 210 may be directly connected in series, parallel or series-parallel, and then an entirety of the plurality of battery cells 210 is accommodated in a box 10; or certainly, the battery 200 may be formed by a plurality of battery cells 210 being connected in series, parallel or series-parallel first to form a battery module and then a plurality of battery modules being connected in series, parallel or series-parallel to form an entirety which is accommodated in a box 10. The battery 200 may further include other structures. For example, the battery 200 may further include a busbar configured to implement electrical connection between the plurality of battery cells 210.

Figure 4:
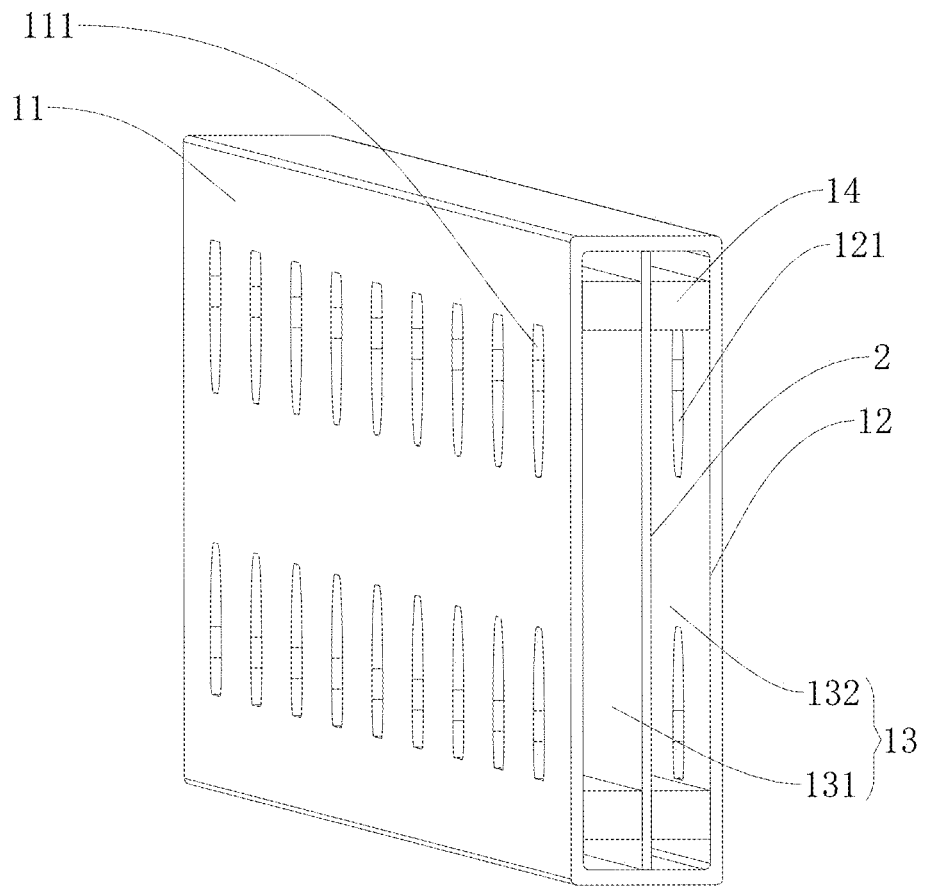
FIG. 4 is a schematic structural diagram of a structural beam according to an embodiment of this application.
Figure 5:
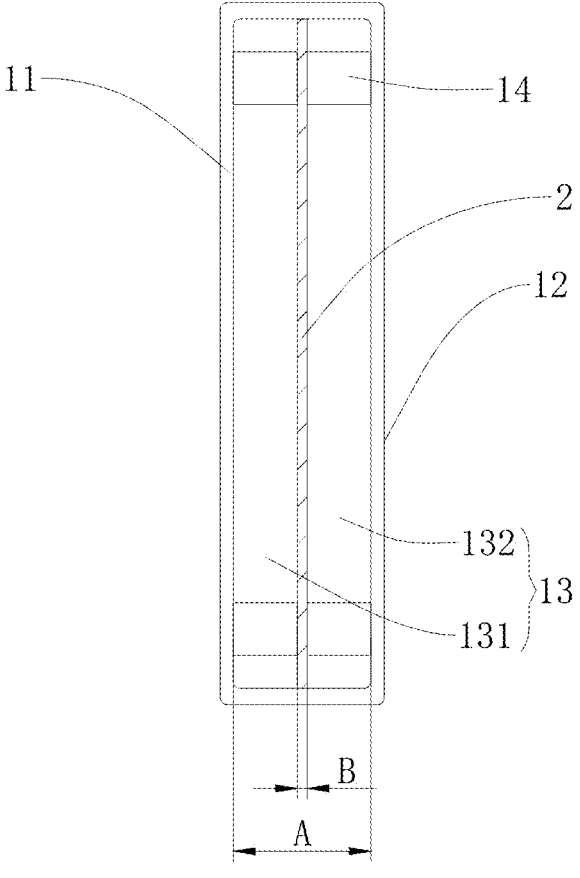
FIG. 5 is a schematic structural diagram of the structural beam in FIG. 4 from another perspective.

Referring to FIGS. 4 and 5, this application provides a structural beam 100. The structural beam 100 includes a first side wall 11 and a second side wall 12, where an exhaust passage 13 is formed between the first side wall 11 and the second side wall 12. The first side wall 11 is provided with a first exhaust portion 111, where the first exhaust portion 111 is configured to receive emissions from at least one battery cell 210. The second side wall 12 is provided with a second exhaust portion 121, where the second exhaust portion 121 is configured to receive emissions from at least one of remaining battery cells 210.

The structural beam 100 may be a strip structure, and a cross section thereof perpendicular to a length direction may be circular, elliptical, semi-circular, trapezoidal, rectangular, or a combination thereof. In some embodiments, the cross section of the structural beam 100 perpendicular to the length direction is rectangular, and such design balances good structural strength with low processing costs. The structural beam 100 includes a first side wall 11 and a second side wall 12 for abutting against battery cells. The structural beam 100 may further include a third side wall, a fourth side wall, a fifth side wall, and so on. The quantity of side walls of the structural beam 100 depends on the quantity of sides of the cross sections of the structural beam 100 perpendicular to the length direction. The side walls of the structural beam 100 are interconnected to form a closed figure. The first side wall 11 and the second side wall 12 may be adjacent to each other, opposite each other, or at a certain angle to each other. An exhaust passage 13 is formed between the first side wall 11 and the second side wall 12, and the exhaust passage 13 can communicate with the outside, allowing gas entering the exhaust passage 13 to be smoothly discharged to the outside. Specifically, openings that communicate with the outside may be provided in some side walls of the structural beam 100, or openings may be provided at ends of the structural beam 100 in the length direction to communicate with the outside.

The first side wall 11 is provided with a first exhaust portion 111, where the first exhaust portion 111 may be a hole structure. The first exhaust portion 111 may be provided corresponding to an explosion-proof valve of a battery cell 210, and may be adapted to the size and shape of the explosion-proof valve, allowing the explosion-proof valve to open smoothly when the battery cell experiences thermal runaway. It should be noted that the quantity of first exhaust portions 111 may be one or more, and the specific number thereof matches the quantity of explosion-proof valves in the battery cells abutting against the first side wall 11. When any battery cell abutting against the first side wall 11 experiences thermal runaway, an explosion-proof valve of the battery cell opens to allow gas inside the battery cell to be ejected into an exhaust space.

The second side wall 12 is provided with a second exhaust portion 121, where the second exhaust portion 121 may be a hole structure. The second exhaust portion 121 is similarly provided corresponding to an explosion-proof valve of a battery cell, and may be adapted to the size and shape of the explosion-proof valve, allowing the explosion-proof valve to open smoothly when the battery cell experiences thermal runaway. It should be noted that the quantity of second exhaust portions 121 may be one or more, and the specific number thereof matches the quantity of explosion-proof valves in the battery cells abutting against the second side wall 12. When any battery cell abutting against the second side wall 12 experiences thermal runaway, an explosion-proof valve of the battery cell opens to allow gas inside the battery cell to be ejected into an exhaust space.

The structural beam 100 in this embodiment can use a beam cavity for exhaust, saving space. In addition, after the battery cells 210 are grouped and attached to the beam, the structural strength is also enhanced. When a battery cell 210 experiences thermal runaway, an explosion-proof valve opens, and high-temperature gas ejected enters the beam cavity along the first exhaust portion 111 or the second exhaust portion 121. The high-temperature gas ejected from the battery cell 210 and internal substance particles of the battery cell 210 mixed therein can enter the exhaust passage 13, avoiding a chain reaction caused by surrounding battery cells 210 of the battery cell 210 in thermal runaway coming into contact with the high-temperature gas and the like.

In summary, provision of the exhaust passage 13 inside the structural beam 100 allows battery cells 210 on two sides of the structural beam 100 to exhaust gas into the exhaust passage 13 through holes in the first side wall 11 or second side wall 12, thus improving the arrangement of battery cells inside compartment of a battery 200, saving internal space of the battery 200, and increasing volume utilization and energy density of the battery 200.

In one of the embodiments, the first side wall 11 and the second side wall 12 are disposed opposite each other in a first direction.

Refer to FIG. 5. The first side wall 11 and the second side wall 12 may be parallel to each other. It should be noted that "parallel" herein refers to approximately parallel, that is, a small angle deviation between the two is allowed, not strictly parallel. In this way, the battery cells 210 are arranged on two sides of the structural beam 100, facilitating arrangement of the battery cells 210 into groups. In addition, such arrangement allows the battery cells 210 on two sides of the structural beam 100 to be at the farthest distance from each other while maintaining contact with the structural beam 100, thereby improving heat dissipation for the battery while ensuring effective exhaust.

In this embodiment, the battery cells 210 are arranged on two sides of the structural beam 100, facilitating arrangement of the battery cells 210 into groups. Such arrangement also improves heat dissipation for the battery 200 while ensuring effective exhaust.

In one of the embodiments, in the first direction, the first exhaust portion 111 and the second exhaust portion 121 are staggered.

Staggered arrangement means that the first exhaust portion 111 and the second exhaust portion 121 do not overlap in the first direction. The staggered arrangement of the first exhaust portion 111 and second exhaust portion 121 prevents emissions ejected from the first exhaust portion 111 and second exhaust portion 121 from affecting each other.

In one of the embodiments, in the first direction, the first exhaust portion 111 and the second exhaust portion 121 are opposite each other; and the structural beam 100 further includes a thermal insulation member 2, where the thermal insulation member 2 is disposed between the first exhaust portion 111 and the second exhaust portion 121.

In a same battery, the specifications of battery cells 210 are usually the same, and the positions of explosion-proof valves in the battery cells 210 are also usually the same. Arrangement of the first exhaust portion 111 and the second exhaust portion 121 opposite each other ensures corresponding arrangement of the battery cells 210 on two sides, thereby optimizing the overall arrangement of the battery and improving assembly efficiency. In addition, the of the first exhaust portion 111 and the second exhaust portion 121 opposite each other in the structural beam 100 can also reduce processing difficulty, thereby reducing processing costs.

The thermal insulation member 2 may be a flat plate structure, and the quantity of thermal insulation members 2 may be one or more. The thermal insulation member 2 may be made of a material with high temperature resistance and strong thermal insulation capabilities, such as asbestos, calcium silicate fiber, or a magnesium cementitious material. The thermal insulation member 2 can separate the exhaust passage 13, thereby preventing battery cells 210 in directions of the first side wall 11 and second side wall 12 from affecting each other in a case of thermal runaway. In one of the embodiments, the thermal insulation member 2 is thermal insulation foam, where the thermal insulation foam has low costs and light weight, conducive to reducing the costs of the battery and increasing the energy density of the battery.

In this embodiment, the thermal insulation member 2 separates the exhaust passage 13, preventing battery cells 210 in the directions of the first side wall 11 and second side wall 12 from affecting each other in a case of thermal runaway.

In one of the embodiments, in the first direction, a projection of the first exhaust portion 111 and a projection of the second exhaust portion 121 at least partially overlap to form an overlapping region, and a projection of the thermal insulation member 2 covers at least the overlapping region.

In the first direction, the projection of the first exhaust portion 111 and the projection of the second exhaust portion 121 overlap to form the overlapping region, and the projection of the thermal insulation member 2 covers at least the overlapping region. In this way, the thermal insulation member 2 can prevent battery cells 210 in the directions of the first side wall 11 and second side wall 12 from affecting each other in a case of thermal runaway.

In one of the embodiments, the structural beam 100 extends along a second direction, the first side wall 11 is provided with a plurality of first exhaust portions 111, the second side wall 12 is provided with a plurality of second exhaust portions 121, and the thermal insulation member 2 extends along the second direction and is located between the first side wall 11 and the second side wall 12.

In this embodiment, the thermal insulation member 2 and the structural beam 100 extend in the same direction, facilitating not only blocking of the emissions ejected from the first exhaust portion 111 and second exhaust portion 121 but also installation of the thermal insulation member 2. Specifically, the thermal insulation member can be smoothly installed inside the structural beam 100 in an extension direction of the structural beam 100.

In one of the embodiments, the thermal insulation member 2 separates the exhaust passage 13 into a first passage 131 and a second passage 132, where the first passage 131 communicates with the first exhaust portion 111, and the second passage 132 communicates with the second exhaust portion 121.

Refer to FIG. 4. In this embodiment, the emissions ejected from the first exhaust portion 111 enter the first passage 131, and the emissions ejected from the second exhaust portion 121 enter the second passage 132, avoiding mutual interference.

In one of the embodiments, the thermal insulation member 2 is configured to be movable inside the exhaust passage 13 in the first direction, so as to change size of the first passage 131 or second passage 132.

The thermal insulation member 2 can actively or passively move along a direction of a line connecting the first side wall 11 and the second side wall 12, so as to change the sizes of the first passage 131 and the second passage 132. In this way, in a case of thermal runaway of a battery cell 210 on a side, the size of the first passage 131 or second passage 132 can be correspondingly increased, thereby improving the exhaust efficiency and enhancing the safety of the battery. Specifically, the thermal insulation member 2 can move under the action of the high-temperature gas ejected from the battery cell 210. The thermal insulation member 2 can also move under the action of an external driving member, where the external driving member may be any structure or means capable of driving the thermal insulation member 2 to move along any direction or any trajectory, for example, a telescopic cylinder, a telescopic hydraulic cylinder, or a motor rail structure. Furthermore, the external driving member may be connected to a sensor or controller. In this way, when high-temperature gas appears in a space on one side of the thermal insulation member 2, the external driving member can move to the other side under a command of the sensor or controller, thereby expanding an exhaust space on the side of the battery cell 210 in thermal runaway.

In this embodiment, the thermal insulation member 2 can change the sizes of the first passage 131 and second passage 132. In a case of thermal runaway of a battery cell 210 on a side, the size of the first passage 131 or second passage 132 can be correspondingly increased, thereby improving the exhaust efficiency and enhancing the safety of the battery 200.

In one of the embodiments, the structural beam 100 further includes a support member 14, where the support member 14 is configured to fix the thermal insulation member 2.

Refer to FIGS. 4 and 5. One or more support member 14 may be provided. The support member 14 may be connected to both the thermal insulation member 2 and the structural beam 100. A specific connection manner may be glue adhesion, snap-fitting, or the like. In this way, the support member 14 can guarantee position and posture of the thermal insulation member 2 under normal conditions. When a battery cell 210 experiences thermal runaway and ejects gas into the exhaust passage 13, the thermal insulation member 2 can be melted. In this case, the thermal insulation member 2 loses the support of the support member 14 and can move under the propulsion of the gas ejected from the battery cell 210 in thermal runaway, thereby expanding the exhaust space on the side of the battery cell 210 in thermal runaway. Moreover, the thermal insulation member 2 is attached to the side wall opposite the battery cell 210 in thermal runaway and seals the holes on that side wall, thereby preventing the high-temperature gas ejected from the battery cell 210 in thermal runaway from directly hitting the opposite battery cell 210, thus avoiding a chain reaction. This embodiment utilizes the characteristic of the support member 14 that it can be melted under high-temperature gas, allowing the thermal insulation member 2 to adaptively adjust a position thereof, turning the entire beam cavity space into the exhaust space for the battery cell 210 in thermal runaway, thereby improving the exhaust effect. In this embodiment, the support member 14 can guarantee position and posture of the thermal insulation member 2 under normal conditions.

In one of the embodiments, at least a portion of the support member 14 is configured to be able to react with emissions from the battery cells 210, so as to enable the thermal insulation member 2 to be movable in the first direction.

At least a portion of the support member 14 can react with the emissions from the battery cells 210. The reaction herein includes physical and chemical reactions. In this way, the support member 14 can be made from various components, and as long as some components can be burned off after the reactions, the support member 14 loses its supporting function. When a battery cell 210 experiences thermal runaway and ejects gas into the exhaust passage 13, the thermal insulation member 2 can be melted, so that the thermal insulation member 2 can move under the propulsion of the gas ejected from the battery cell 210 in thermal runaway, thereby expanding the exhaust space on the side of the battery cell 210 in thermal runaway.

In one of the embodiments, at least a portion of the support member 14 is configured to be able to be melted when the emissions from the battery cells 210 are discharged into the exhaust passage 13.

The support member 14 can be melted when a battery cell 210 ejects emissions. A specific melting point of the support member 14 can be set depending on an actual situation. For example, the melting point can be set between 150° C. and 300° C. In this way, the thermal insulation member 2 can move under the propulsion of the gas ejected from the battery cell 210 in thermal runaway, thereby expanding the exhaust space on the side of the battery cell 210 in thermal runaway. In one of the embodiments, the support member 14 is made of foam or plastic. Foam and plastic have certain structural strength at room temperature and have low melting points, so they can be melted quickly when a battery cell 210 experiences thermal runaway, allowing the thermal insulation member 2 to move under the propulsion of the gas ejected from battery cell 210 in thermal runaway.

In one of the embodiments, the structural beam 100 has an exhaust gap C, satisfying the following: A–B=C, and 3 mm≤C≤50 mm, where A is distance between the first side wall 11 and the second side wall 12, and B is thickness of the thermal insulation member 2.

Refer to FIG. 5. The exhaust gap C can represent an effective exhaust cross-sectional area of the exhaust passage 13. When the thermal insulation member 2 is too thick and the distance between the first side wall 11 and the second side wall 12 is too small, the effective exhaust cross-sectional area of the exhaust passage 13 is too small, affecting the exhaust efficiency. When the thermal insulation member 2 is too thin and the distance between the first side wall 11 and the second side wall 12 is too large, the occupied volume of the structural beam 100 is too large, wasting the internal space of the battery. Therefore, this embodiment has limit on the exhaust gap C to ensure that the exhaust passage 13 has a good exhaust effect, thereby improving the safety of the battery; and the miniaturization of the structural beam 100 is also taken into consideration to improve the volume utilization of the battery.

In one of the embodiments, the structural beam 100 is further provided with a reinforcing member 3, where the reinforcing member 3 is disposed inside the exhaust passage 13 and located between the first side wall 11 and the second side wall 12, the reinforcing member 3 separates the exhaust passage 13 into a first sub-passage 31 and a second sub-passage 32, and the reinforcing member 3 is provided with a communicating hole 33 communicating with the first sub-passage 31 and the second sub-passage 32.

Figure 6:
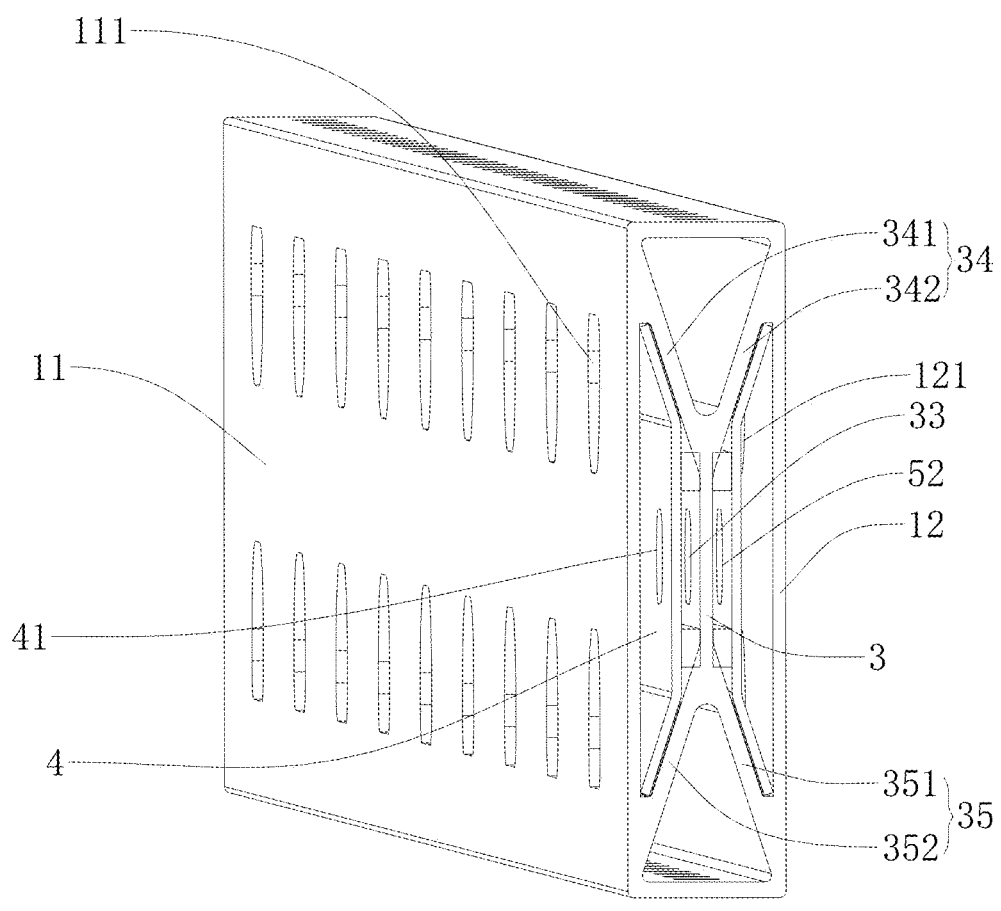
FIG. 6 is a schematic structural diagram of a structural beam according to another embodiment of this application.
Figure 7:
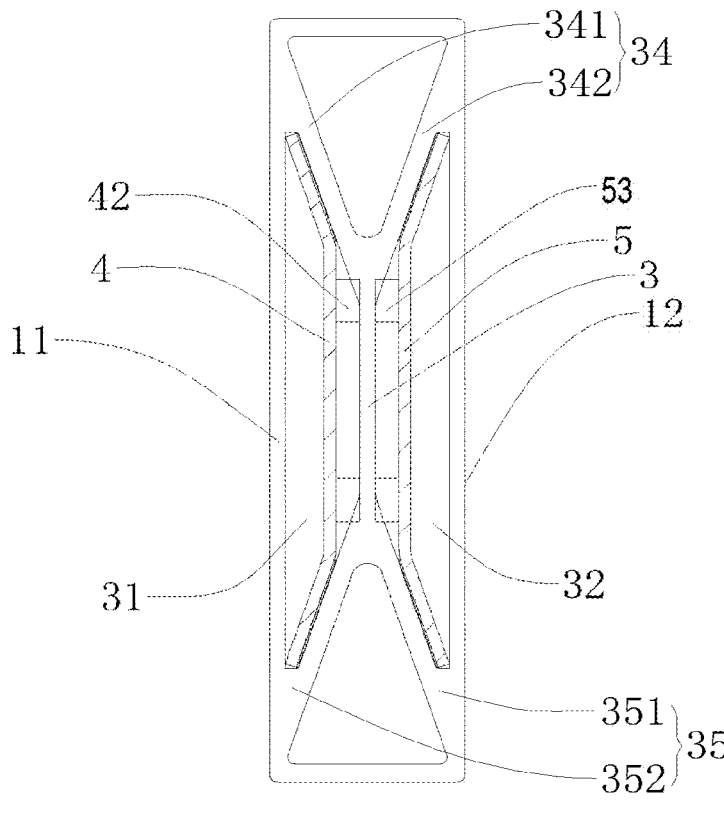
FIG. 7 is a schematic structural diagram of the structural beam in FIG. 6 from another perspective.

Refer to FIGS. 6 and 7. The reinforcing member 3 may be a flat plate structure and is disposed in the length direction of the structural beam 100 inside the exhaust passage 13, thereby separating the exhaust passage 13 into the first sub-passage 31 and the second sub-passage 32. The reinforcing member 3 may be integrally formed with the structural beam 100, or the reinforcing member 3 may be connected to the structural beam 100 through connectors such as bolts or rivets.

The reinforcing member 3 is further provided with the communicating hole 33, and a cross section of the communicating hole 33 may be circular, elliptical, semi-circular, trapezoidal, rectangular, or a combination thereof. The quantity of communicating holes 33 may be one or more. Preferably, the quantity of communicating holes 33 matches the quantity of first exhaust portions 111 or second exhaust portions 121, and the position of the communicating hole 33 may match the first exhaust portion 111 and/or the second exhaust portion 121.

The reinforcing member 3 enhances the structural strength of the structural beam 100, and the communicating hole 33 in the reinforcing member 3 can ensure that the gas ejected from the battery cell 210 can be expelled through the first sub-passage 31 and second sub-passage 32, thereby improving the exhaust efficiency.

In one of the embodiments, in the first direction, both the first exhaust portion 111 and the second exhaust portion 121 are staggered with respect to the communicating hole 33.

Referring to the aforementioned concept of staggering, in this embodiment, both the first exhaust portion 111 and the second exhaust portion 121 are staggered with respect to the communicating hole 33, which can prevent the gas ejected from the communicating hole 33 from directly hitting the first exhaust portion 111 or the second exhaust portion 121, thereby preventing high-temperature gas from directly hitting the battery cell 210.

In one of the embodiments, the first exhaust portion 111, the second exhaust portion 121, and the communicating hole 33 are each provided in plurality; where the plurality of communicating holes 33 include a first communicating hole; and in the first direction, one of any adjacent first exhaust portion 111 and second exhaust portion 121 overlaps a projection of the first communicating hole, and the other is staggered with respect to the projection of the first communicating hole.

It can be understood that provision of multiple first exhaust portions 111, second exhaust portions 121, and communicating holes 33 can improve the exhaust efficiency. In the first direction, one of adjacent first exhaust portion 111 and second exhaust portion 121 overlapping the first communicating hole and the other being staggered with respect to the first communicating hole can prevent the gas ejected from the first communicating hole from directly hitting the first exhaust portion 111 or the second exhaust portion 121, thereby preventing high-temperature gas from directly hitting the battery cell 210.

In one of the embodiments, the reinforcing member 3 includes a first connecting end 34 and a second connecting end 35 opposite each other, where the first connecting end 34 and the second connecting end 35 are both connected to two opposite side walls of the structural beam.

Refer to FIGS. 6 and 7. The first connecting end 34 and the second connecting end 35 may be respectively disposed at two ends of the reinforcing member 3. The first connecting end 34 and the second connecting end 35 correspondingly support two opposite sides of the structural beam 100, further enhancing the structural strength of the structural beam 100.

In one of the embodiments, the first connecting end 34 includes a first sub-connecting portion 341 and second sub-connecting portion 342 arranged in a bifurcated manner, where the first sub-connecting portion 341 is connected to the first side wall 11, and the second sub-connecting portion 342 is connected to the second side wall 12.

Refer to FIGS. 6 and 7. The first sub-connecting portion 341 and the second sub-connecting portion 342 both extend outward from a main body of the reinforcing member 3, and are arranged in a bifurcated manner to form a certain angle. The first sub-connecting portion 341 and the second sub-connecting portion 342 respectively support the first side wall 11 and the second side wall 12. In this way, the first connecting end 34 roughly forms a triangular structure, further enhancing the structural strength of the structural beam 100.

In one of the embodiments, the second connecting end 35 includes a third sub-connecting portion 351 and fourth sub-connecting portion 352 arranged in a bifurcated manner, where the third sub-connecting portion 351 is connected to the first side wall 11, and the fourth sub-connecting portion 352 is connected to the second side wall 12.

Refer to FIGS. 6 and 7. The third sub-connecting portion 351 and the fourth sub-connecting portion 352 both extend outward from the main body of the reinforcing member 3, and are arranged in a bifurcated manner to form a certain angle. The third sub-connecting portion 351 and the fourth sub-connecting portion 352 respectively support the first side wall 11 and the second side wall 12. In this way, the second connecting end 35 roughly forms a triangular structure, further enhancing the structural strength of the structural beam 100.

In one of the embodiments, the structural beam 100 further includes protective members, where the protective members include a first protective member 4 and a second protective member 5, the first protective member 4 is located between the first exhaust portion 111 and the communicating hole 33, and the second protective member 5 is located between the second exhaust portion 121 and the communicating hole 33.

Refer to FIGS. 6 and 7. The first protective member 4 and the second protective member 5 may be flat plate structures, and may be made of materials with high temperature resistance and strong thermal insulation capabilities, such as asbestos, calcium silicate fiber, or magnesium cementitious materials. The first protective member 4 can block entering of high-temperature gas from the first sub-passage 31 through the communicating hole 33 into the second sub-passage 32, and the second protective member 5 can block entering of high-temperature gas from the second sub-passage 32 through the communicating hole 33 into the first sub-passage 31, thereby preventing the battery cells 210 on the two sides from affecting each other.

In one of the embodiments, the first protective member 4 and the second protective member 5 are each provided with a ventilation hole. It can be understood that provision of the ventilation holes can fully utilize the exhaust passage to enhance the exhaust capability.

In one of the embodiments, the ventilation holes include a first ventilation hole 41 and a second ventilation hole 52, where the first ventilation hole 41 is provided in the first protective member 4, and a projection of the first ventilation hole 41 in the first direction is staggered with respect to the first exhaust portion 111; and the second ventilation hole 52 is provided in the second protective member 5, and a projection of the second ventilation hole 52 in the first direction is staggered with respect to the second exhaust portion 121.

Refer to FIGS. 6 and 7. With the above positional relationships between holes designed, the first protective member 4 can prevent high-temperature gas from directly heading to the first exhaust portion 111, and the second protective member 5 can prevent high-temperature gas from directly heading to the second exhaust portion 121, thereby preventing the high-temperature gas generated by the battery cell 210 in thermal runaway from triggering a chain reaction.

In one of the embodiments, in the first direction, a projection of the ventilation hole at least partially overlaps a projection of the communicating hole 33. The overlapping of the ventilation hole and the communicating hole 33 can improve the exhaust efficiency.

Specifically, thermal runaway of a battery cell 210 abutting against the first side wall 11 is used as an example. The battery cell 210 ejects gas into the space between the first protective member 4 and the first side wall 11 along the first exhaust portion 111. Since the first exhaust portion 111 does not overlap the first ventilation hole 41 in the first protective member 4, the high-temperature gas cannot be directly ejected into the space between the first protective member 4 and the reinforcing member 3. However, as the ejecting process continues, the high-temperature gas will enter the space between the first protective member 4 and the reinforcing member 3 along the first ventilation hole 41. Since the first ventilation hole 41 and the communicating hole 33 at least partially overlap, some of the high-temperature gas can enter the space between the reinforcing member 3 and the second protective member 5 along the communicating hole 33, and some of the high-temperature gas in the space between the reinforcing member 3 and the second protective member 5 will enter the space between the second protective member 5 and the second side wall 12 along the second ventilation hole 52. Since a projection of the second ventilation hole 52 in a direction of a line connecting the first side wall 11 and the second side wall 12 does not overlap the second exhaust portion 121, the high-temperature gas cannot be directly ejected onto the second exhaust portion 121, thereby preventing a battery cell 210 behind the second exhaust portion 121 from being directly affected by the high-temperature gas, and thus avoiding thermal runaway of the battery cell 210 abutting against the second side wall 12. In this embodiment, the staggered design of the first ventilation hole 41 and the first exhaust portion 111 avoids direct ejection of the high-temperature gas into the space between the first protective member 4 and the reinforcing member 3, thereby improving the exhaust utilization of the space between the first side wall 11 and the first protective member 4. The overlapping design of the first ventilation hole 41 and the communicating hole 33 improves the space efficiency for the high-temperature gas entering between the reinforcing member 3 and the second protective member 5, thereby better utilizing the space between the reinforcing member 3 and the second protective member 5 for exhaust. In addition, the staggered design between the second ventilation hole 52 and the second exhaust portion 121 avoids direct influence of the high-temperature gas on the battery cell 210 behind the second exhaust portion 121, thus improving safety.

Since the structural beam 100 can be roughly regarded as a symmetrical structure with the reinforcing member 3 as the center of symmetry, when the battery cell 210 abutting against the second side wall 12 experiences thermal runaway, the exhaust process and exhaust effect thereof are similar to the foregoing description. Details are not described herein again.

In one of the embodiments, the structural beam 100 further includes a first thermal insulation retainer 42 and a second thermal insulation retainer 53. The first thermal insulation retainer 42 fixes the first protective member 4 to the structural beam 100, and the second thermal insulation retainer 53 fixes the second protective member to the structural beam 100. The first thermal insulation retainer 42 and the second thermal insulation retainer 53 can be melted when the battery cell 210 ejects gas into the exhaust passage 13.

Refer to FIGS. 6 and 7. One or more first thermal insulation retainer 42 and second thermal insulation retainer 53 may be provided, and they can connect the first protective member 4 and the second protective member 5 to the structural beam 100. A specific connection manner may be glue adhesion, snap-fitting, or the like. In this way, the first thermal insulation retainer 42 and the second thermal insulation retainer 53 can maintain position and posture of the first protective member 4 and second protective member 5 under normal conditions. When a battery cell 210 experiences thermal runaway, the first thermal insulation retainer 42 and the second thermal insulation retainer 53 will be melted.

In one of the embodiments, the first thermal insulation retainer 42 and the second thermal insulation retainer 53 are made of foam or plastic. Foam or plastic has low costs and light weight, conducive to reducing the costs of the battery and increasing the energy density of the battery.

This application provides a box. The box includes the structural beam 100 according to any one of the foregoing embodiments and obviously has the advantages of the foregoing structural beam 100.

This application provides a battery 200. The battery 200 includes a plurality of battery cells 210 and the structural beam 100 according to any one of the foregoing embodiments; or the battery 200 includes a plurality of battery cells 210 and the foregoing box, where the box is configured to accommodate the plurality of battery cells 210.

When experiencing failure, a battery cell 210 inside the battery 200 can promptly expel high-temperature gas, and do not affect surrounding battery cells 210, ensuring good safety.

In one of the embodiments, at least one battery cell 210 is connected to the first side wall 11 of the structural beam 100, and at least another battery cell 210 is connected to the second side wall 12 of the structural beam 100. The battery cells 210 are disposed on two sides of the structural beam 100, improving the safety of the battery 200.

This application provides an electric device 300, where the electric device 300 includes the foregoing battery 200. The battery 200 is configured to supply power for the electric device 300. The electric device 300 obviously has the advantages of the foregoing structural beam 100, which is not be repeated herein, and exhibits better safety performance.

According to some embodiments of this application, a specific embodiment is given, and this embodiment is described with an example of thermal runaway of a battery cell 210 abutting against the first side wall 11.

The structural beam 100 includes a first side wall 11 and a second side wall 12, where an exhaust passage 13 is formed between the first side wall 11 and the second side wall 12. The first side wall 11 is provided with a first exhaust portion 111, and the second side wall 12 is provided with a second exhaust portion 121. The exhaust passage 13 is provided with a reinforcing member 3 inside, and the reinforcing member 3 is provided with a communicating hole 33. The structural beam 100 further includes protective members, where the protective members include a first protective member 4 and a second protective member 5, the first protective member 4 is located between the first exhaust portion 111 and the communicating hole 33, and the second protective member 5 is located between the second exhaust portion 121 and the communicating hole 33.

The battery cell 210 ejects gas into the space between the first protective member 4 and the first side wall 11 along the first exhaust portion 111. Since the first exhaust portion 111 does not overlap the first ventilation hole 41 in the first protective member 4, the high-temperature gas cannot be directly ejected into the space between the first protective member 4 and the reinforcing member 3. However, as the ejecting process continues, the high-temperature gas will enter the space between the first protective member 4 and the reinforcing member 3 along the first ventilation hole 41. Since the first ventilation hole 41 and the communicating hole 33 at least partially overlap, some of the high-temperature gas can enter the space between the reinforcing member 3 and the second protective member 5 along the communicating hole 33, and some of the high-temperature gas in the space between the reinforcing member 3 and the second protective member 5 will enter the space between the second protective member 5 and the second side wall 12 along the second ventilation hole 52. Since a projection of the second ventilation hole 52 in a direction of a line connecting the first side wall 11 and the second side wall 12 does not overlap the second exhaust portion 121, the high-temperature gas cannot be directly ejected onto the second exhaust portion 121, thereby preventing a battery cell 210 behind the second exhaust portion 121 from being directly affected by the high-temperature gas, and thus avoiding thermal runaway of the battery cell 210 abutting against the second side wall 12.

The reinforcing member 3 inside the structural beam 100 includes a first connecting end 34 and a second connecting end 35 opposite each other, where the first connecting end 34 and the second connecting end 35 are both connected to two opposite side walls of the structural beam. The first connecting end 34 includes a first sub-connecting portion 341 and second sub-connecting portion 342 arranged in a bifurcated manner, where the first sub-connecting portion 341 is connected to the first side wall 11, and the second sub-connecting portion 342 is connected to the second side wall 12. The second connecting end 35 includes a third sub-connecting portion 351 and fourth sub-connecting portion 352 arranged in a bifurcated manner, where the third sub-connecting portion 351 is connected to the first side wall 11, and the fourth sub-connecting portion 352 is connected to the second side wall 12. In this case, the first connecting end 34 and the second connecting end 35 may be respectively disposed at two ends of the reinforcing member 3, and the first connecting end 34 and the second connecting end 35 correspondingly support two opposite sides of the structural beam 100, further enhancing the structural strength of the structural beam 100.

In addition, the first sub-connecting portion 341 and the second sub-connecting portion 342 both extend outward from a main body of the reinforcing member 3, and are arranged in a bifurcated manner to form a certain angle. The first sub-connecting portion 341 and the second sub-connecting portion 342 respectively support the first side wall 11 and the second side wall 12. In this way, the first connecting end 34 roughly forms a triangular structure, further enhancing the structural strength of the structural beam 100. The third sub-connecting portion 351 and the fourth sub-connecting portion 352 both extend outward from the main body of the reinforcing member 3, and are arranged in a bifurcated manner to form a certain angle. The third sub-connecting portion 351 and the fourth sub-connecting portion 352 respectively support the first side wall 11 and the second side wall 12. In this way, the second connecting end 35 roughly forms a triangular structure, further enhancing the structural strength of the structural beam 100.

In this embodiment, the staggered design of the first ventilation hole 41 and the first exhaust portion 111 avoids direct ejection of the high-temperature gas into the space between the first protective member 4 and the reinforcing member 3, thereby improving the exhaust utilization of the space between the first side wall 11 and the first protective member 4. The overlapping design of the first ventilation hole 41 and the communicating hole 33 improves the space efficiency for the high-temperature gas entering between the reinforcing member 3 and the second protective member 5, thereby better utilizing the space between the reinforcing member 3 and the second protective member 5 for exhaust. In addition, the staggered design between the second ventilation hole 52 and the second exhaust portion 121 avoids direct influence of the high-temperature gas on the battery cell 210 behind the second exhaust portion 121, thus improving safety.

The foregoing descriptions are merely preferable embodiments of this application, but are not intended to limit this application. Any modification, equivalent replacement, or improvement made without departing from the spirit and principle of this application shall fall within the protection scope of this application.

The invention claimed is:

1. A battery, comprising:
a plurality of battery cells; and
a structural beam, the plurality of battery cells disposed on two sides of the structural beam,
wherein the structural beam comprises:
a first side wall and a second side wall, wherein an exhaust passage is formed between the first side wall and the second side wall;
the first side wall is provided with a first exhaust portion, wherein the first exhaust portion is configured to receive emissions from at least one of the battery cells; and the second side wall is provided with a second exhaust portion, wherein the second exhaust portion is configured to receive emissions from at least another one of the battery cells;

the structural beam is further provided with a reinforcing structure, wherein the reinforcing structure is disposed inside the exhaust passage and located between the first side wall and the second side wall, the reinforcing structure separates the exhaust passage into a first sub-passage and a second sub-passage, and the reinforcing structure is provided with a communicating hole communicating with the first sub-passage and the second sub-passage;

the reinforcing structure comprises a first connecting end and a second connecting end opposite each other, wherein the first connecting end and the second connecting end are both connected to two opposite side walls of the structural beam;

the first connecting end comprises a first sub-connecting portion and second sub-connecting portion arranged in a bifurcated manner, wherein the first sub-connecting portion is connected to the first side wall, and the second sub-connecting portion is connected to the second side wall; and the second connecting end comprises a third sub-connecting portion and fourth sub-connecting portion arranged in a bifurcated manner, wherein the third sub-connecting portion is connected to the first side wall, and the fourth sub-connecting portion is connected to the second side wall.

2. The battery according to claim 1, characterized in that the first side wall and the second side wall are opposite each other in a first direction.

3. The battery according to claim 1, characterized in that in the first direction, the first exhaust portion and the second exhaust portion are staggered.

4. The battery according to claim 1, characterized in that in the first direction, the first exhaust portion and the second exhaust portion are both staggered with respect to the communicating hole.

5. The battery according to claim 1, characterized in that the first exhaust portion, the second exhaust portion, and the communicating hole are each provided in plurality; wherein the plurality of communicating holes comprise a first communicating hole; and in a first direction, one of any adjacent first exhaust portion and second exhaust portion overlaps a projection of the first communicating hole, and the other is staggered with respect to the projection of the first communicating hole.

6. The battery according to claim 1, characterized in that the structural beam further comprises protective members, wherein the protective members comprise a first protective member and a second protective member, the first protective member is located between the first exhaust portion and the communicating hole, and the second protective member is located between the second exhaust portion and the communicating hole.

7. The battery according to claim 6, characterized in that a first ventilation hole is provided in the first protective member, and a projection of the first ventilation hole in a first direction is staggered with respect to the first exhaust portion;

a second ventilation hole is provided in the second protective member, and a projection of the second ventilation hole in the first direction is staggered with respect to the second exhaust portion; and in the first direction, a projection of the first ventilation hole or the second ventilation hole at least partially overlaps a projection of the communicating hole.

8. The battery according to claim 1, wherein at least one of the battery cells is connected to the first side wall of the structural beam, and at least another of the battery cells is connected to the second side wall of the structural beam.

9. An electric device, characterized in that the electric device comprises the battery according to claim 8, wherein the battery is configured to supply power for the electric device.

* * * * *